(12) United States Patent
Xu et al.

(10) Patent No.: US 12,399,745 B2
(45) Date of Patent: Aug. 26, 2025

(54) RESOURCE SCHEDULING METHOD, DEVICE, AND STORAGE MEDIUM

(71) Applicant: BEIJING BAIDU NETCOM SCIENCE TECHNOLOGY CO., LTD., Beijing (CN)

(72) Inventors: Binbin Xu, Beijing (CN); Liang Tang, Beijing (CN); Ying Zhao, Beijing (CN); Shupeng Li, Beijing (CN); En Shi, Beijing (CN); Zhengyu Qian, Beijing (CN); Yongkang Xie, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 580 days.

(21) Appl. No.: 17/744,396

(22) Filed: May 13, 2022

(65) Prior Publication Data
US 2022/0276899 A1 Sep. 1, 2022

(30) Foreign Application Priority Data
Jul. 7, 2021 (CN) .......................... 202110768951.3

(51) Int. Cl.
*G06F 9/50* (2006.01)
*G06T 1/20* (2006.01)

(52) U.S. Cl.
CPC .......... *G06F 9/5033* (2013.01); *G06F 9/5044* (2013.01); *G06T 1/20* (2013.01)

(58) Field of Classification Search
CPC ............................. G06F 9/5033; G06F 9/5044
See application file for complete search history.

(56) References Cited

U.S. PATENT DOCUMENTS 10,325,343 B1 * 6/2019 Zhao ..................... H04L 41/122
10,896,064 B2   1/2021 Fong et al.
(Continued)

FOREIGN PATENT DOCUMENTS

CN  110058937 A  7/2019
CN  110096356 A  8/2019
(Continued)

OTHER PUBLICATIONS

The State Intellectual Property Office of People's Rebulic of China; Chinese Office Action and Search Report; Chinese Application No. 2021107689513; Mar. 29, 2022; 19 pages.
(Continued)

*Primary Examiner* — Lewis A Bullock, Jr.
*Assistant Examiner* — Carlos Alberto Espana
(74) *Attorney, Agent, or Firm* — Faegre Drinker Biddle & Reath LLP

(57) ABSTRACT

A resource scheduling method and apparatus, a device, and a storage medium are provided, and relates to the field of computer technology, and in particular to the field of deep learning technology. The method includes: acquiring a graphics processing unit (GPU) topology relationship of a cluster according to GPU connection information of each of computing nodes in the cluster; and in a case where a task request, for applying for a GPU resource, for a target task is received, determining a target computing node of the target task and a target GPU in the target computing node according to the task request and the GPU topology relationship, to complete GPU resource scheduling of the target task. The present disclosure can optimize the resource scheduling.

9 Claims, 6 Drawing Sheets

(56) References Cited

U.S. PATENT DOCUMENTS

2017/0010920 A1 1/2017 Abouzour et al.
2019/0312772 A1* 10/2019 Zhao .................... G06F 9/5011

FOREIGN PATENT DOCUMENTS

| CN | 110389843 | A | 10/2019 |
|----|-----------|---|---------|
| CN | 110399222 | A | 11/2019 |
| CN | 110647999 | A | 1/2020 |
| CN | 111865630 | A | 10/2020 |
| CN | 111880911 | A | 11/2020 |
| CN | 112433844 | A | 3/2021 |
| IN | 110618870 | A | 12/2019 |
| WO | 2021/051713 | A1 | 3/2021 |

OTHER PUBLICATIONS

European Patent Office; European Extended Search Report; EP Application No. 22173337.1; 11 pages; dated Oct. 5, 2022.
Yeh, Ting-An et al.; KubeShare: A Framework to Manage GPUs as First-Class and Shared Resources in Container Cloud; Proceedings of the 29th International Symposium on High-Performance Parallel and Distributed Computing; 12 pages; Jun. 23, 2020.

* cited by examiner

RESOURCE SCHEDULING METHOD, DEVICE, AND STORAGE MEDIUM

CROSS-REFERENCE TO RELATED APPLICATION

This application claims priority to Chinese patent application No. 202110768951.3, filed on Jul. 7, 2021, which is hereby incorporated by reference in its entirety.

TECHNICAL FIELD

The present disclosure relates to the field of the computer technology, in particular to the field of deep learning technology, and further relates to a resource scheduling method and apparatus, a device, and a storage medium.

BACKGROUND

With the development of the artificial intelligence technology, it is necessary to build deep learning applications for various scenarios. At the same time, as the deep learning model becomes more complex, and has more and more parameters, there is an increasing amount of user data, the distributed training has become the first choice for the deep learning training. In order to train a deep learning model with a better performance through massive data, it is necessary to efficiently call and manage a large-scale Graphics Processing Unit (GPU). From a platform perspective, how to use less GPU resources to complete more user training tasks has become a challenge and a development direction.

SUMMARY

The present disclosure provides an optimized resource scheduling method and apparatus, a device, and a storage medium.

According to an aspect of the present disclosure, a resource scheduling method is provided, including: acquiring a graphics processing unit (GPU) topology relationship of a cluster according to GPU connection information of each of computing nodes in the cluster; and in a case where a task request, for applying for a GPU resource, for a target task is received, determining a target computing node of the target task and a target GPU in the target computing node according to the task request and the GPU topology relationship, to complete GPU resource scheduling of the target task.

According to another aspect of the present disclosure, an electronic device is provided, including: at least one processor; and a memory connected communicatively to the at least one processor, wherein the memory stores instructions executable by the at least one processor, and the instructions, when executed by the at least one processor, enable the at least one processor to perform the above resource scheduling method.

According to another aspect of the present disclosure, a non-transitory computer readable storage medium storing computer instructions is provided, wherein the computer instructions, when executed by a computer, cause the a computer to perform the above resource scheduling method.

It should be understood that the contents described in this section are not intended to recognize key or important features of embodiments of the present disclosure, nor are they intended to limit the scope of the present disclosure.

Other features of the present disclosure will become easily understood from the following description.

BRIEF DESCRIPTION OF THE DRAWINGS

The drawings are used to better understand the solution and do not constitute a limitation to the present disclosure. In the drawings.

DETAILED DESCRIPTION

The exemplary embodiments of the disclosure will be described below in combination with drawings, including various details of the embodiments of the disclosure to facilitate understanding, which should be considered as exemplary only. Therefore, those of ordinary skill in the art should realize that various changes and modifications can be made to the embodiments described herein without departing from the scope and spirit of the present disclosure. Likewise, descriptions of well-known functions and structures are omitted in the following description for clarity and conciseness.

At present, the resource scheduling method on the public cloud usually includes the following two implementation schemes.

Figure 1:
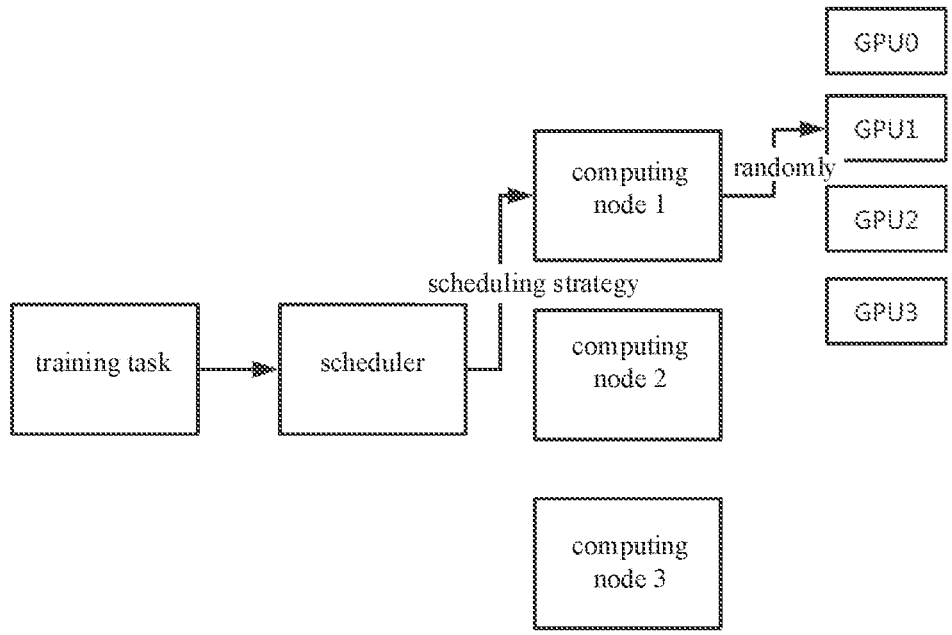
FIG. 1 is a schematic diagram of a resource scheduling process in the related art.

Scheme 1: a scheduler perceives the GPU resource requirements of a training task, selects a target computing node through multiple scheduling strategies, such as the binpack strategy, the priority strategy, etc., and randomly selects a GPU by a default device-plugin on the target computing node, to complete a resource scheduling process for the task that needs to apply for GPU resources, which can refer to FIG. 1 for details.

Although different scheduling strategies are considered in the resource scheduling process in the above scheme 1, the target computing node selected in the actual resource scheduling process can be a different computing node that needs to interact through the CPU, resulting in the slower training speed.

Figure 2:
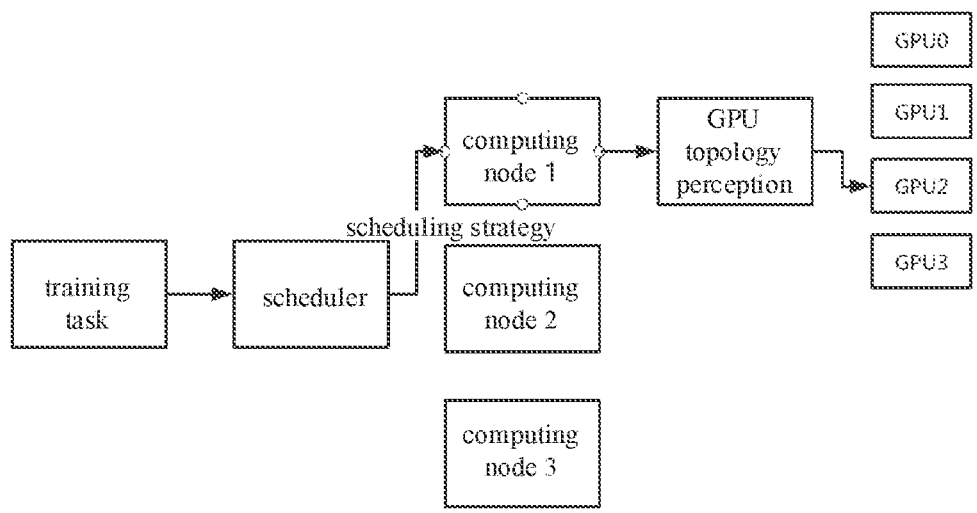
FIG. 2 is a schematic diagram of a resource scheduling process in the related art.

Scheme 2: a scheduler perceives the GPU resource requirements of a training task, selects a target computing node through multiple scheduling strategies, such as the binpack strategy, the priority strategy, etc., perceives, on each target computing node including GPU resources, the GPU topology relationship of the target computing node, and selects the optimal GPU through the perceived topology relationship, to complete a resource scheduling process for the task that needs to apply for GPU resources, which can refer to FIG. 2 for details.

Compared with the above scheme 1, in the scheme 2, although the GPU topology relationship is perceived on each target computing node, the selected target computing node can also be a computing node that need to interact through the CPU. Even though the GPU topology relationship perception is performed on the target computing node, and the optimal GPU in the target computing node is selected, this is not the optimal resource scheduling scheme for the overall cluster.

In view of the defects in the above schemes, the present disclosure proposes a resource scheduling method and apparatus. In the selection process of a target computing node, a computing node with the best performance is selected by perceiving the topology relationship of the GPU, and the optimal GPU is selected in the GPU resource scheduling of the target computing node, so as to realize the optimal scheduling of resources.

The subject of performing the resource scheduling method in the embodiment of the present disclosure is a resource scheduling device. The resource scheduling device can be a scheduler, including but not limited to an independent server, a distributed server, a server cluster, a cloud server, a smart phone, a tablet computer, a computer, a personal digital assistant (PDA), a notebook computer, an ultra-mobile personal computer (UMPC), etc.

Figure 3:
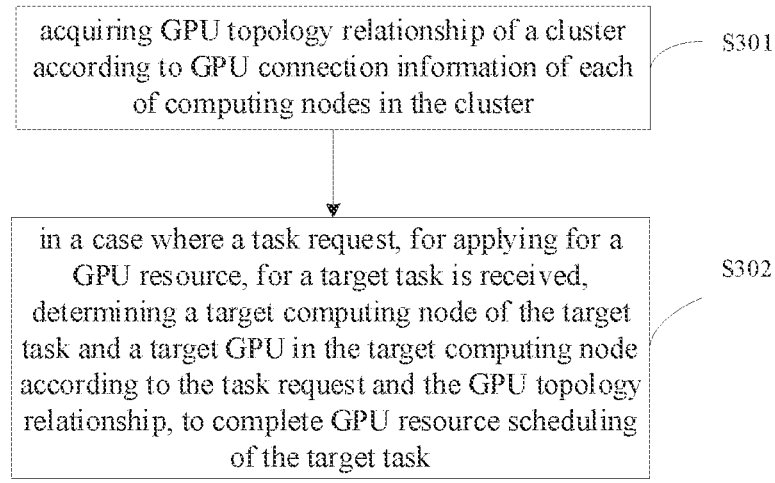
FIG. 3 is a flowchart of resource scheduling according to an exemplary embodiment of the present disclosure.

Please refer to FIG. 3, which is a flowchart of a resource scheduling method shown in an exemplary embodiment of the present disclosure. The resource scheduling method shown in FIG. 3 specifically includes the following operations:

S301: acquiring GPU topology relationship of a cluster according to GPU connection information of each of computing nodes in the cluster.

S302: in a case where a task request, for applying for a GPU resource, for a target task is received, determining a target computing node of the target task and a target GPU in the target computing node according to the task request and the GPU topology relationship, to complete GPU resource scheduling of the target task.

In the embodiment of the present disclosure, in a case where the task request, for applying for the GPU resource, for the target task is received, the target computing node is selected from the computing nodes included in the cluster according to the acquired GPU topology relationship of the cluster, which can guarantee that the selected target computing node is a computing node with the best performance, and thus the selection of the GPU on the target computing node with the best performance can realize the reasonable scheduling of the GPU resources and improve the training speed of the target task.

It should be noted that the GPU connection information includes a GPU connection relationship and a GPU connection manner. The GPU connection relationship is used to describe the connection sequence relationship between GPUs. Specifically, the GPU connection relationship can be the connection network relationship between GPUs. For example, the GPU connection relationship is GPU1-GPU2- GPU3, and at this time, GPU2 can be connected to GPU1 and GPU2 simultaneously. The GPU connection manner is used to describe the communication manner between GPUs. Specifically, the GPU connection manner includes a plurality of data communication manners with different transmission performances, such as the high-speed data communication manner, the low-speed data communication manner, and the communication manner between the high and low speeds.

Figure 4:
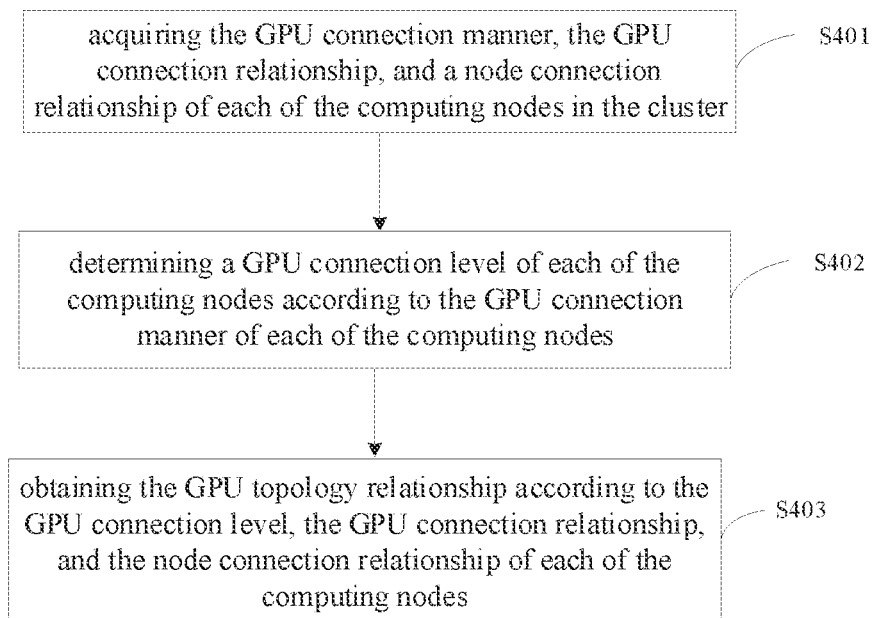
FIG. 4 is a flowchart of acquiring a GPU topology relationship of a cluster according to an exemplary embodiment of the present disclosure.

As shown in FIG. 4, in an implementation manner, the operation S301 can include the following sub-operations:

S401: acquiring the GPU connection manner, the GPU connection relationship, and a node connection relationship of each of the computing nodes in the cluster.

S402: determining a GPU connection level of each of the computing nodes according to the GPU connection manner of each of the computing nodes.

S403: obtaining the GPU topology relationship according to the GPU connection level, the GPU connection relationship, and the node connection relationship of each of the computing nodes.

The GPU connection level is used to represent a transmission performance between GPUs, and the node connection relationship is used to describe the connection sequence relationship of the computing nodes.

In an implementation manner, the operation S402 can be implemented through the following process: different connection manners are scored according to the connection relationship between the GPUs, to obtain the GPU connection level; for GPUs with the connection relationship, different scores are used to represent the transmission performances, and the higher the score is, the stronger the transmission performance is.

Through the above process, the GPU topology relationship of the cluster can be obtained according to the GPU connection information of each of the computing nodes in the cluster, such that the GPU topology relationship can be considered in the scheduling strategy of the target computing node and the target GPU.

Figure 5:
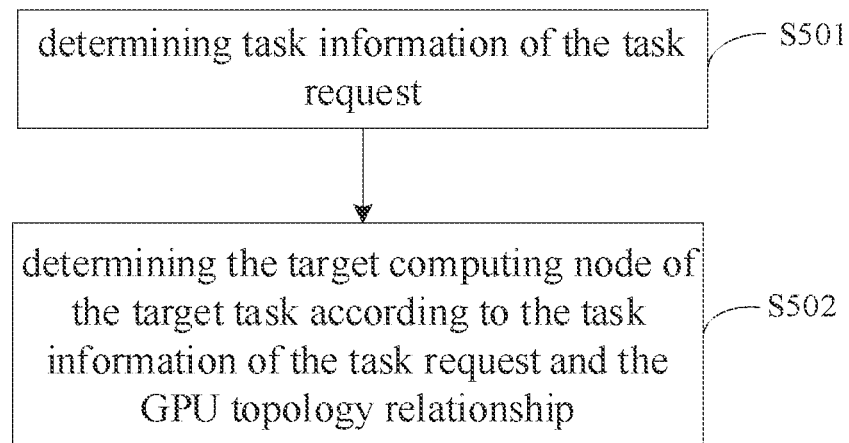
FIG. 5 is a flowchart of determining a target computing node according to an exemplary embodiment of the present disclosure.

As shown in FIG. 5, in an implementation manner, in the case of determining the target computing node, the operation S302 can include the following sub-operations:

S501: determining task information of the task request.

S502: determining the target computing node of the target task according to the task information of the task request and the GPU topology relationship.

The task information includes a task type of the target task and/or the number of GPUs applied for, and the task type includes single-task and multi-task.

In the above process, the target computing node is determined according to the task information of the target computing node and the GPU topology relationship, and the task information is comprehensively considered under the premise of considering the GPU topology relationship, such that different scheduling strategies of the target computing node can be obtained according to different task information, and thus the resource scheduling is optimized.

In the specific implementation process of the above operation S502, according to different task information, the determining the target computing node of the target task according to the task information of the task request and the GPU topology relationship, includes the following three situations:

Situation 1: in the case where the task type of the target task included in the task information is single-task and the number of GPUs applied for is 1, traversing each of the computing nodes according to the GPU topology relationship, and selecting a computing node with the lowest transmission performance as the target computing node.

For the training task in which the target task is single-task and that only needs to apply for one GPU, in the case of selecting the target computing node, it is necessary to select a computing node with a poor transmission performance. The reason for this design is that a training task applying for one GPU has no requirement to communicate with another task. Therefore, there is no data interaction process between GPUs. In this case, the scheduling strategy of the target computing node can be designed to traverse each of the computing nodes, and select a node with the lowest transmission performance as the target computing node. In addition, in the selection process of the target computing node, the selection of the target computing node can also be completed in combination with other scheduling strategies.

It can be seen from the above analysis that for the training task in which the target task is single-task and that only needs to apply for one GPU, less GPU resources are required to complete the target task at this time. Therefore, the selected target computing node is a node with the lowest transmission performance, realizing the optimal scheduling of GPU resources and saving the GPU resources.

Situation 2: in the case where the task type of the target task included in the task information is single-task and the number of GPUs applied for is larger than 1, traversing each of the computing nodes according to the GPU topology relationship, and selecting a computing node with the highest transmission performance as the target computing node.

For the training task in which the target task is single-task and that needs to apply for multiple GPUs, the strategy for selecting the target computing node is opposite to the strategy for applying for one GPU, and it is necessary to select a computing node with the highest transmission performance. Therefore, in the scheduling strategy of the target computing node, through the GPU connection relationship and the GPU connection level in the acquired GPU topology relationship, the computing nodes are sorted according to the optimal transmission performance that can be supported, and a computing node with the highest transmission performance under the premise of satisfying the number of GPUs can be selected as the target computing node. In addition, in the selection process of the target computing node, other scheduling strategies can be combined to complete the selection of the target computing node.

It can be seen from the above analysis that, for the training task in which the target task is single-task and that needs to apply for multiple GPU, more GPU resources are required to complete the target task at this time. Therefore, the selected target computing node is a node with the highest transmission performance, and under the premise of ensuring the GPU resources of the target task, the optimal target GPU is selected to complete the target task, realizing the optimal scheduling of the GPU resources and improving the speed of distributed training of the target task.

Situation 3: in the case where the task type of the target task included in the task information is multi-task and the number of GPUs applied for is larger than 1, traversing each of the computing nodes according to the GPU topology relationship, determining whether there are candidate computing nodes with GPU resources that are able to satisfy the target task in the cluster, and determining the target computing node according to whether there are the candidate computing nodes, which can further include the following two implementation manners:

Implementation manner a: it is determined that there are candidate computing nodes with all GPU resources that are able to satisfy the target task, the target task is converted into a task that is single-task and the number of GPUs applied for is greater than 1, and further reference can be made to the above situation 2, that is, the computing node with the highest transmission performance is selected from the candidate computing nodes as the target computing node.

In this way, under the premise that the GPU resources of the target task can be satisfied, the computing node with the highest transmission performance is selected as the target computing node, realizing the optimal scheduling of the GPU resources and improving the speed of distributed training of the target task.

For example, the target task includes 2 instances, and each of the instances needs to apply for 3 GPUs. In the case where the target task can be converted into a task that is single-task and applies for multiple GPUs, the target task is converted into a task that is single-task and needs to apply for 6 GPUs, and the target computing node is selected, referring to the above situation 2.

Implementation manner b: it is determined that there are no candidate computing nodes with all GPU resources that are able to satisfy the target task, in the cluster, for each task included in the target task, a computing node, in which the number of GPUs is able to satisfy the task, is selected from the computing nodes as the target computing node, according to a descending order of transmission performances of the computing nodes.

In this way, in the case where there are no candidate computing nodes with all GPU resources that are able to satisfy the target task, for each task in the target task, the target computing node can be selected orderly, such that multiple different target computing nodes can be selected to jointly complete the target task, realizing the optimal scheduling of the GPU resources.

For example, the target task includes 2 instances, which are the instance 1 and the instance 2, respectively, and each of the instances needs to apply for 3 GPUs. In the case where the target task cannot be converted into a task that is single-task and applies for multiple GPUs, for the instance 1, according to the descending order of transmission performances of the computing nodes, a computing node 1 that is able to satisfy the number of 3 GPUs is selected from the computing nodes, to perform the instance 1; for the instance 2, according to the descending order of transmission performances of the computing nodes, a computing node 2 that is able to satisfy the number of 3 GPUs is selected from the computing nodes, to perform the instance 2. At this time, the selected target computing nodes are the computing node 1 and the computing node 2. In this process, it is necessary to ensure that the transmission performance of the computing node 1 is the same as that of the computing node 2.

For the training task in which the target task is multi-task and that needs to apply for multiple GPUs, the strategy for selecting the target computing node is designed to: all computing nodes are traversed, and it is determined whether there are candidate computing nodes with GPU resources that are able to satisfy the target task, according to the traversal result; in the case where there are candidate computing nodes with GPU resources that are able to satisfy the target task, the target task is converted to a task that is single-task and needs to apply for multiple GPU, and the subsequent process can refer to the above situation 2; in the case where there are no candidate computing nodes with GPU resources that are able to satisfy the target task, according to the number of tasks included in the target task, the computing nodes are sorted from high to low according to the transmission performance, and multiple target computing nodes with the same highest transmission performance, each of which is able to satisfy the number of GPUs for the corresponding task, are selected from the computing nodes, at the same time, the selection of the target computing nodes is completed in combination with other scheduling strategies. In this case, the number of selected target computing nodes is same as the number of instances included in the target task.

The transmission performance of the computing node in the present disclosure is determined according to the GPU transmission performance of the computing node, and can represent the data transmission speed of the computing node.

Figure 6:
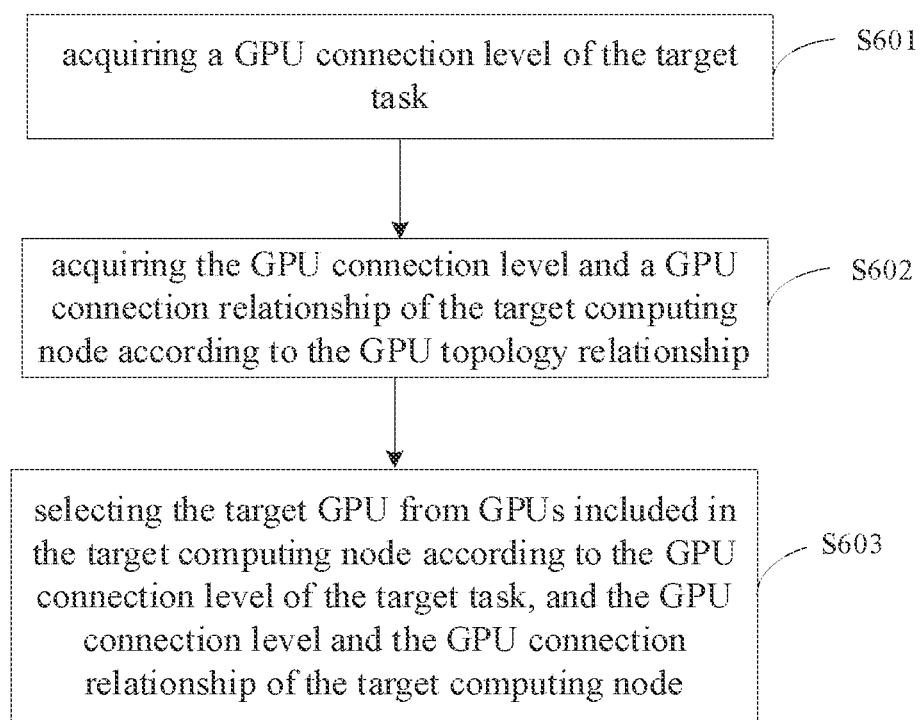
FIG. 6 is a flowchart of determining a target GPU according to an exemplary embodiment of the present disclosure.

As shown in FIG. 6, in an implementation manner, in the case of determining the target GPU, the operation S302 can include the following sub-operations.

S601: acquiring a GPU connection level of the target task.

S602: acquiring the GPU connection level and a GPU connection relationship of the target computing node according to the GPU topology relationship.

S603: selecting the target GPU from GPUs included in the target computing node according to the GPU connection level of the target task, and the GPU connection level and the GPU connection relationship of the target computing node.

It should be noted that the GPU connection level of the target task refers to the GPU connection level required to complete the target task, and the GPU connection level of the target computing node refers to the GPU connection level between GPUs in the multiple GPUs included in the target computing node.

Through the above process, a target GPU with better performance can be selected according to the GPU connection relationship of the target computing node, so as to provide the prerequisite support for completing the binding of the target task and the corresponding target GPU.

It should be noted that, after the selection of the target computing node is completed, the GPU connection level selected for the target task is associated with each of the instances corresponding to the target task through annotations.

The process of selecting a GPU in the operation S603 can correspond to a GPU resource scheduling process, which is a process running on each of the target computing nodes and is responsible for completing the GPU binding of the target task allocated to the target computing node.

After the above operation S603, a corresponding target computing node is selected for each target task, and the GPU connection level is written into the annotation of the target task at the same time. In the case of performing the GPU resource scheduling, the GPU connection level is read, and the corresponding GPU is selected as the target GPU according to the GPU topology relationship on the target computing node, and the binding process of the target task and the target GPU is completed.

Figure 7:
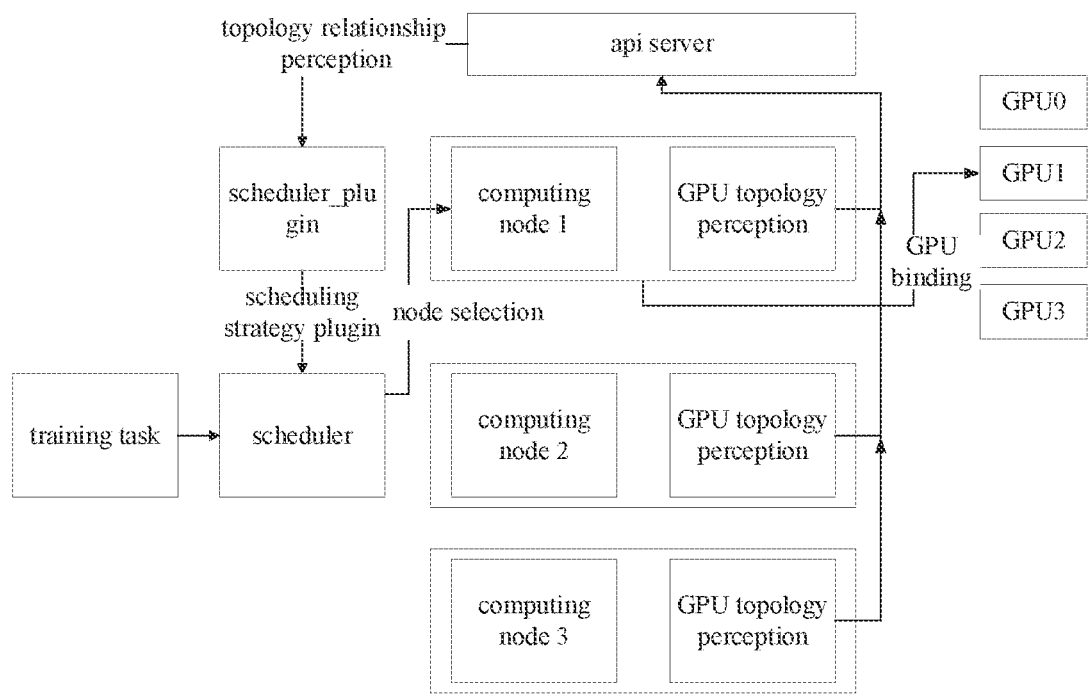
FIG. 7 is a schematic diagram of a resource scheduling application scenario in a Kubernetes cluster that can implement an embodiment of the present disclosure.

Exemplarily, FIG. 7 is a schematic diagram of a resource scheduling application scenario in a Kubernetes cluster shown by an exemplary embodiment of the present disclosure.

Exemplarily, for ease of understanding, some terms involved in the embodiments of the present disclosure are explained.

Kubernetes: it is abbreviated as K8s, is a system for running and coordinating a containerized application program on a resource allocation device, and provides mechanisms for application deployment, planning, update and maintenance.

Pod: it is a basic unit of the Kubernetes system, is the smallest component created or deployed by users, is a combination of one or more containers, also is a resource object for running the containerized application on the Kubernetes system, and can also be called as an instance.

Api server: it belongs to a component in Kubernetes, and other components can share the state interaction through the component.

GPU topology perception: it is a resident process running on each of the computing nodes in the Kubernetes cluster; in the running course, the process perceives the connection information, specifically including the number of GPUs and the connection relationships between GPUs, of the GPUs on the computing node where the process is located, constructs the connection matrix of the GPUs, and at the same time scores different connection manners according to the connection relationships between the GPUs. Taking a certain GPU as an example, the connection manners between GPUs include NVIDIA (NVLINK) high-speed data communication manner, a manner of performing data communication through a high-speed serial computer extended bus standard (peripheral component interconnect express (PCIe)) switch (PIX), and a manner for completing data exchange across multiple PCIe switches (PXB), etc. The communication speed of the NVLINK is better than that of the PIX, and the communication speed of the PIX is better than that of the PXB. After the connection matrix is constructed, for GPUs with connection relationships, different scores are used to represent the GPU connection levels. The higher the score is, the stronger the transmission performance is. After collecting the GPU connection relationships and GPU connection levels, the GPU topology perception process reports the GPU connection information including the GPU connection relationships and GPU connection levels to the api server, and the GPU topology relationship can be seen at the control plane level.

Scheduler_plugin: it belongs to a plug-in in the scheduler, and the main function thereof is to, in the case of perceiving a task request that needs to apply for GPU resources, generate a scheduling strategy for selecting the target computing node according to the task request and the GPU topology relationship.

Scheduler is a native scheduler or extended scheduler in Kubernetes. For example, it can be a volcano scheduler for offline batch jobs, and the main function thereof is to load the scheduling strategy in Scheduler_plugin and to perform the selection process of the target computing node.

Exemplarily, Kubernetes is deployed and run in the resource scheduling device in advance. The task request that needs to apply for GPU resources can be received through the api server. In the case where the task request is received, a pod object is created accordingly. Wherein, a pod object corresponds to a task request, which can be understood as that a task request is received every time, a pod object is created accordingly.

In the present disclosure, the involved single-task refers to that one pod object is trained by one deep learning distributed training, and multi-task refers to that multiple pods are trained by one deep learning distributed training, such as multiple worker nodes under the AllReduce module.

The resource scheduling method involved in the present disclosure can be run in the native scheduler or the extended scheduler of the kubernetes through the scheduler_plugin. In the case where the scheduler_plugin perceives that the target task needs to apply for GPU resources, the scheduler_plugin makes the corresponding judgment according to the number of GPUs applied for and the number of tasks in the task request, to obtain the scheduling strategy of the target computing node. The scheduler completes the selection of the target computing node according to the scheduling strategy, and the target computing node completes the GPU binding according to the assigned target task, to realize the optimal scheduling of GPU resources.

Figure 8:
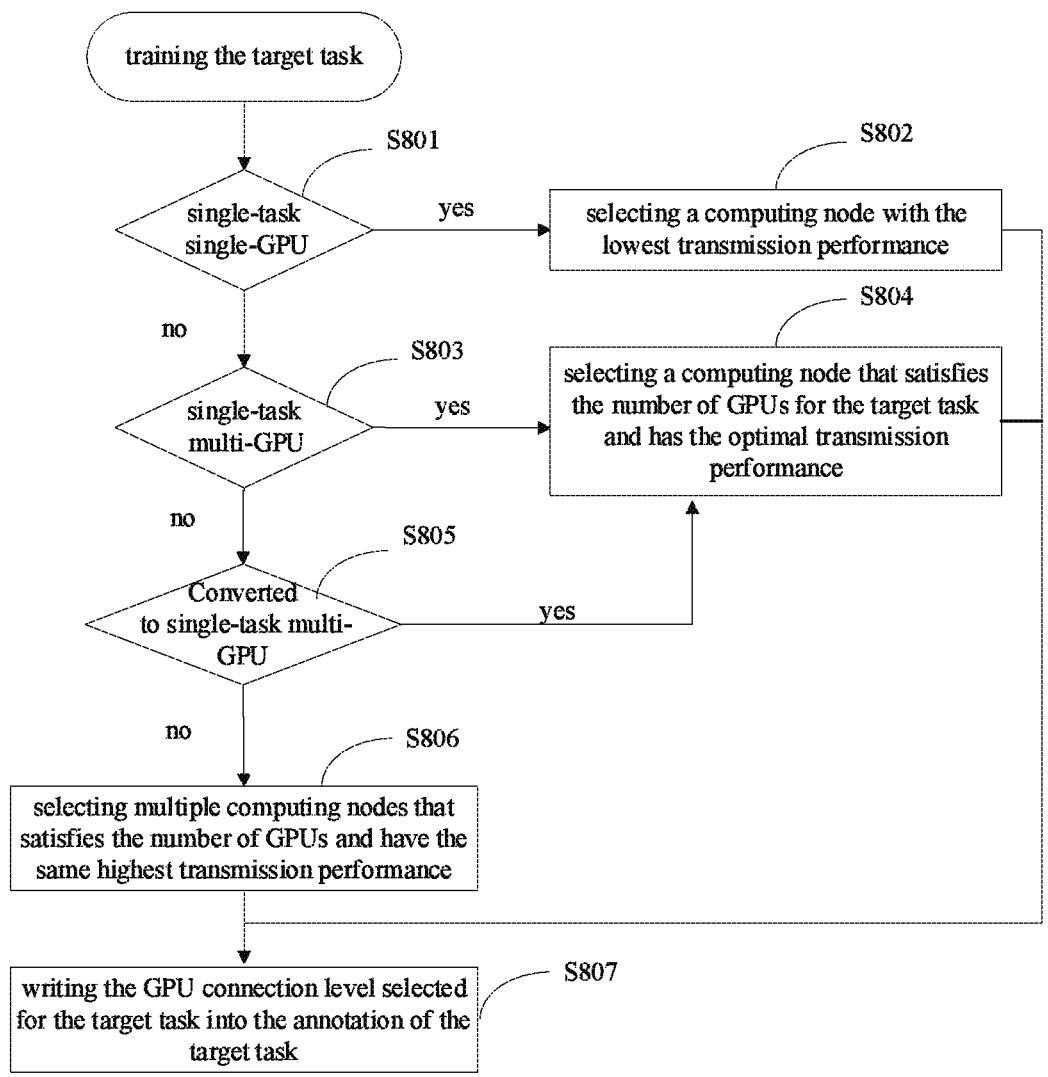
FIG. 8 is a flowchart of a scheduling process of a target computing node according to an exemplary embodiment of the present disclosure.

Exemplarily, FIG. 8 is a schematic diagram of a scheduling process of a target computing node shown in an exemplary embodiment of the present disclosure, which specifically includes the following operations:

S801: in a case where the training request of the target task is received, determining whether the target task is single-task single-GPU; in the case where the target task is single-task single-GPU, performing S802; otherwise, performing S803.

Single-task single-GPU refers to that the target task is a single pod and only needs to apply for one GPU.

S802: selecting a computing node with the lowest transmission performance as the target computing node, and performing S807.

S803: determining whether the target task is single-task multi-GPU; in the case where the target task is single-task multi-GPU, performing S804; otherwise, performing S805.

Single-task multi-GPU refers to that the target task is a single pod and only needs to apply for multiple GPUs.

S804: selecting a computing node that satisfies the number of GPUs for the target task and has the optimal transmission performance, as the target computing node, and performing S807.

S805: determining whether the target task can be converted to single-task multi-GPU; in the case where the target task can be converted to single-task multi-GPU, performing S804; otherwise, performing S806.

S806: for multiple pods, selecting multiple computing nodes that satisfies the number of GPUs and have the same highest transmission performance, as the target computing nodes, and performing S807.

S807, for the selected target computing nodes, writing the GPU connection level selected for the target task into the annotation of the target task.

To sum up, the resource scheduling method in the embodiment of the present disclosure realizes resource optimization scheduling by perceiving the GPU topology relationship. Specifically, based on the containerized environment, in the scheduling strategy of the target computing node, under the premise of perceiving the GPU topology relationship, it is ensured that the determined target computing node is a computing node with the optimal GPU connection performance. At the same time, a GPU scheduling algorithm is added on the target computing node, such that the optimal target GPU can be selected to complete the target task.

Figure 9:
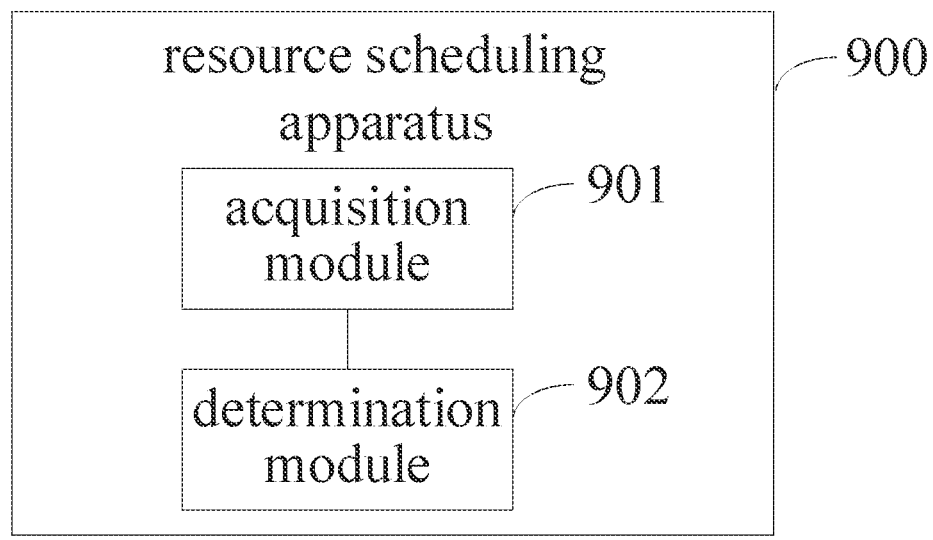
FIG. 9 is a block diagram of a resource scheduling apparatus according to an exemplary embodiment of the present disclosure.

Please refer to FIG. 9, which is a block diagram of a resource scheduling apparatus 900 shown in an exemplary embodiment of the present disclosure. The resource scheduling apparatus 900 includes:

an acquisition module 901, configured for acquiring a graphics processing unit (GPU) topology relationship of a cluster according to GPU connection information of each of computing nodes in the cluster; and a determination module 902, configured for, in a case where a task request, for applying for a GPU resource, for a target task is received, determining a target computing node of the target task and a target GPU in the target computing node according to the task request and the GPU topology relationship, to complete GPU resource scheduling of the target task.

In an implementation, the GPU connection information includes a GPU connection relationship and a GPU connection manner, and the acquisition module 901 includes:

a GPU topology relationship acquisition sub-module, configured for acquiring the GPU connection manner, the GPU connection relationship, and a node connection relationship of each of the computing nodes in the cluster;

a GPU connection level determination sub-module, configured for determining a GPU connection level of each of the computing nodes according to the GPU connection manner of each of the computing nodes; and a GPU topology relationship generation sub-module, configured for obtaining the GPU topology relationship according to the GPU connection level, the GPU connection relationship, and the node connection relationship of each of the computing nodes, wherein the GPU connection level is used to represent a transmission performance between GPUs.

In an implementation manner, the determination module 902 includes:

a task information determination sub-module, configured for determining task information of the task request; and a target computing node determination sub-module, configured for determining the target computing node of the target task according to the task information of the task request and the GPU topology relationship, wherein the task information includes the task type of the target task and/or the number of GPUs applied for.

In an implementation manner, the target computing node determination sub-module includes:

a first selection unit, configured for, in the case where the task type of the target task included in the task information is single-task and the number of GPUs applied for is 1, traversing each of the computing nodes according to the GPU topology relationship, and selecting a computing node with the lowest transmission performance as the target computing node.

In an implementation manner, the target computing node determination sub-module includes:

a second selection unit, configured for, in the case where the task type of the target task included in the task information is single-task and the number of GPUs applied for is larger than 1, traversing each of the computing nodes according to the GPU topology relationship, and selecting a computing node with the highest transmission performance as the target computing node.

In an implementation manner, the target computing node determination sub-module includes:

a third selection unit, configured for, in the case where the task type of the target task included in the task information is multi-task and the number of GPUs applied for is larger than 1, traversing each of the computing nodes according to the GPU topology relationship; and in a case where a traversal result indicates that there are candidate computing nodes with GPU resources that are able to satisfy the target task, selecting a computing node with the highest transmission performance from the candidate computing nodes as the target computing node.

In an implementation manner, the target computing node determination sub-module includes:

a fourth selection unit, configured for, in the case where the task type of the target task included in the task information is multi-task and the number of GPUs applied for is larger than 1, traversing each of the computing nodes according to the GPU topology relationship; and in a case where a traversal result indicates that there are no candidate computing nodes with GPU resources that are able to satisfy the target task, for each task in the target task, selecting a computing node, in which the number of GPUs is able to satisfy the task, from the computing nodes as the target computing node, according to a descending order of transmission performances of the computing nodes.

In an implementation manner, the determination module 902 includes:

a target task acquisition sub-module, configured for acquiring a GPU connection level of the target task;

a target computing node acquisition sub-module, configured for acquiring a GPU connection level and a GPU connection relationship of the target computing node according to the GPU topology relationship; and a target GPU selection sub-module, configured for selecting the target GPU from GPUs included in the target computing node according to the GPU connection level of the target task, and the GPU connection level and the GPU connection relationship of the target computing node.

In the technical solution of the disclosure, the acquisition, storage, application, etc., of the user's personal information comply with the provisions of relevant laws and regulations, and do not violate public order and good customs.

According to an embodiment of the present disclosure, the present disclosure also provides an electronic device, a readable storage medium, and a computer program product.

Figure 10:
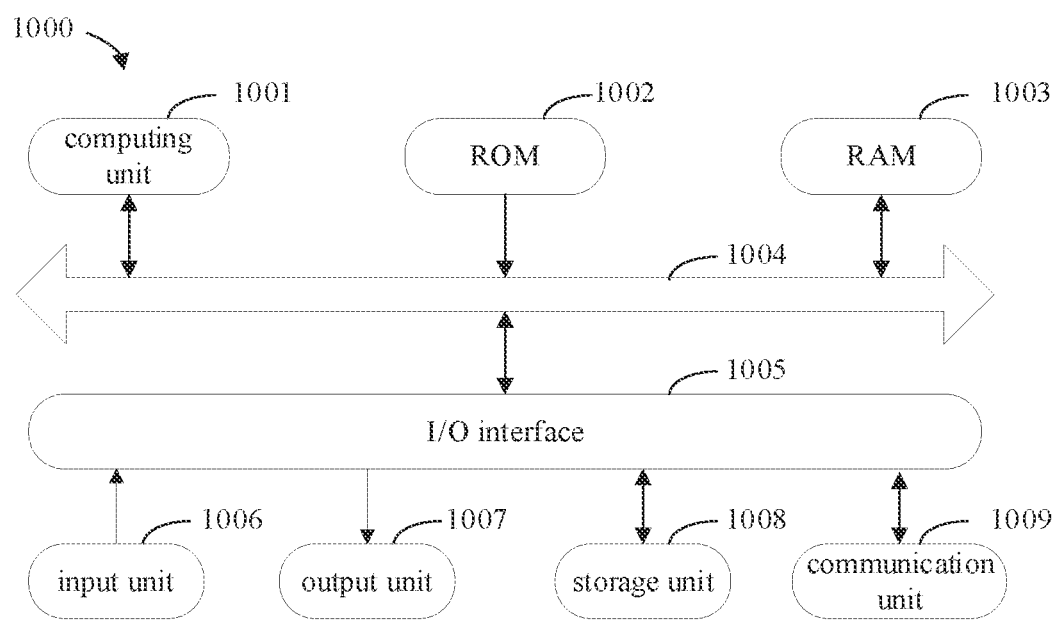
FIG. 10 is a block diagram of an electronic device for implementing a resource scheduling method of an embodiment of the present disclosure.

FIG. 10 shows a schematic block diagram of an example electronic device 1000 that can be used to implement embodiments of the present disclosure. The electronic device is intended to represent various forms of digital computers, such as laptop computers, desktop computers, workbenches, personal digital assistants, servers, blade servers, mainframe computers, and other suitable computers. The electronic device can also represent various forms of mobile apparatuses, such as personal digital assistants, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 10, the device 1000 includes a computing unit 1001 that can perform various appropriate actions and processes according to a computer program stored in a read only memory (ROM) 1002 or a computer program loaded from the storage unit 1008 into a random access memory (RAM) 1003. In the RAM 1003, various programs and data required for the operation of the device 1000 can also be stored. The computing unit 1001, the ROM 1002, and the RAM 1003 are connected to each other through a bus 1004. The input/output (I/O) interface 1005 is also connected to the bus 1004.

A plurality of components in the device 1000 are connected to the I/O interface 1005, including: an input unit 1006, such as a keyboard, a mouse, etc.; an output unit 1007, such as various types of displays, speakers, etc.; a storage unit 1008, such as a magnetic disk, an optical disk, etc.; and a communication unit 1009, such as a network card, a modem, a wireless communication transceiver, etc. The communication unit 1009 allows the device 1000 to exchange information/data with other devices through computer networks such as the Internet and/or various telecommunication networks.

The computing unit 1001 can be various general-purpose and/or special-purpose processing components with processing and computing capabilities. Some examples of the computing unit 1001 include, but are not limited to, a central processing unit (CPU), a graphics processing unit (GPU), various special-purpose artificial intelligence (AI) computing chips, various computing units running machine learning model algorithms, digital signal processors (DSPs), and any appropriate processors, controllers, microcontrollers, etc. The computing unit 1001 performs various methods and processes described above, such as a resource scheduling method. For example, in some embodiments, the resource scheduling method can be implemented as a computer software program that is tangibly contained in a machine-readable medium, such as a storage unit 1008. In some embodiments, part or all of the computer program can be loaded and/or installed on the device 1000 via the ROM 1002 and/or the communication unit 1009. When the computer program is loaded into the RAM 1003 and performed by the computing unit 1001, one or more operations of the resource scheduling method described above can be performed. Optionally, in other embodiments, the computing unit 1001 can be configured for performing the resource scheduling method shown in FIGS. 3-5 by any other suitable means (for example, by means of firmware).

The resource scheduling method and apparatus, the device, and the storage medium in embodiments of the present disclosure can realize the optimal scheduling of the target computing node and the optimal scheduling of target GPUs.

Various embodiments of the systems and technologies described above herein can be implemented in a digital electronic circuit system, an integrated circuit system, a field programmable gate array (FPGA), an application specific integrated circuit (ASIC), an application special standard product (ASSP), a system on chip (SOC), a load programmable logic device (CPLD), a computer hardware, firmware, software and/or combinations thereof. These various embodiments can include: implementations in one or more computer programs which can be executed and/or interpreted on a programmable system that includes at least one programmable processor, which can be a special-purpose or general-purpose programmable processor that can receive data and instructions from a storage system, at least one input device, and at least one output device, and transmit the data and instructions to the storage system, the at least one input device, and the at least one output device.

The program codes for implementing the method of the present disclosure can be written in any combination of one or more programming languages. These program codes can be provided to the processor or controller of a general-purpose computer, a special-purpose computer or other programmable data processing apparatuses, such that the program codes, when executed by the processor or controller, enables the functions/operations specified in the flowchart and/or block diagram to be implemented. The program codes can be executed completely on the machine, partially on the machine, partially on the machine and partially on the remote machine as a separate software package, or completely on the remote machine or server.

In the context of the present disclosure, a machine-readable medium can be a tangible medium that can contain or store programs for use by or in combination with an instruction execution system, apparatus, or device. The machine-readable medium can be a machine-readable signal medium or a machine-readable storage medium. The machine readable medium can include, but is not limited to, an electronic, magnetic, optical, electromagnetic, infrared, or semiconductor system, apparatus, or device, or any suitable combination of the above contents. A more specific example of the machine-readable storage medium will include an electrical connection based on one or more lines, a portable computer disk, a hard disks, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above contents.

In order to provide interactions with a user, the system and technology described herein can be implemented on a computer which has: a display apparatus (for example, a CRT (cathode ray tube) or an LCD (liquid crystal display) monitor) for displaying information to the user; and a keyboard and pointing apparatus (for example, a mouse or a trackball), through which the user can provide input to the computer. Other kinds of apparatuses can also be used to provide interactions with a user; for example, the feedback provided to a user can be any form of sensory feedback (for example, visual feedback, auditory feedback, or tactile feedback); and input from a user can be received using any form (including acoustic input, voice input, or tactile input).

The systems and techniques described herein can be implemented in a computing system (for example, as a data server) that includes back-end components, or be implemented in a computing system (for example, an application server) that includes middleware components, or be implemented in a computing system (for example, a user computer with a graphical user interface or a web browser through which the user can interact with the implementation of the systems and technologies described herein) that includes front-end components, or be implemented in a computing system that includes any combination of such back-end components, intermediate components, or front-end components. The components of the system can be interconnected by any form or medium of digital data communication (for example, a communication network). The example of the communication network includes a local area network (LAN), a wide area network (WAN), and the Internet.

The computer system can include a client and a server. The client and the server are generally remote from each other and typically interact through a communication network. The client-server relationship is generated by computer programs that run on respective computers and have a client-server relationship with each other. The server can be a cloud server, a server of a distributed system, or a server combined with a blockchain.

It should be understood that various forms of processes shown above can be used to reorder, add, or delete operations. For example, respective operations described in the present disclosure can be executed in parallel, or can be executed sequentially, or can be executed in a different order, as long as the desired result of the technical solution disclosed in the present disclosure can be achieved, no limitation is made herein.

The above specific embodiments do not constitute a limitation on the protection scope of the present disclosure. It should be understood by those skilled in the art that various modifications, combinations, sub-combinations, and substitutions can be made according to design requirements and other factors. Any modification, equivalent replacement and improvement, and the like made within the spirit and principle of the present disclosure shall be fall in the protection scope of the present disclosure.

What is claimed is:
1. A resource scheduling method, comprising:
acquiring a graphics processing unit (GPU) topology relationship of a cluster according to GPU connection information of each of computing nodes in the cluster;
in a case where a task request, for applying for a GPU resource, for a target task is received, determining a target computing node of the target task and a target GPU in the target computing node according to task information of the task request and the GPU topology relationship, to complete GPU resource scheduling of the target task, wherein the task information comprises a task type of the target task and/or a number of GPUs applied for; and
executing the target task by using the target GPU,
in a case where the task type of the target task comprised in the task information is single-task and the number of GPUs applied for is 1, traversing each of the computing nodes according to the GPU topology relationship, and selecting a computing node with a lowest transmission performance as the target computing node;
in a case where the task type of the target task comprised in the task information is single-task and the number of GPUs applied for is larger than 1, traversing each of the computing nodes according to the GPU topology relationship, and selecting a computing node with a highest transmission performance as the target computing node;
in a case where the task type of the target task comprised in the task information is multi-task and the number of GPUs applied for is larger than 1, traversing each of the computing nodes according to the GPU topology relationship, and determining whether there are candidate computing nodes with GPU resources that are able to satisfy the target task in the cluster, and determining the target computing node according to whether the candidate computing nodes exist;
wherein after determining the target computing node of the target task, a GPU connection level selected for the target task is written into an annotation of the target task, and determining the target GPU in the target computing node according to the task information of the task request and the GPU topology relationship comprises:
reading the GPU connection level selected for the target task; and
selecting a corresponding GPU as the target GPU according to the GPU connection level and the GPU topology relationship,
wherein the GPU connection information comprises a GPU connection relationship and a GPU connection manner, and the acquiring the GPU topology relationship of the cluster according to the GPU connection information of each of the computing nodes in the cluster, comprises:
acquiring the GPU connection manner, the GPU connection relationship, and a node connection relationship of each of the computing nodes in the cluster;
determining a GPU connection level of each of the computing nodes according to the GPU connection manner of each of the computing nodes; and
obtaining the GPU topology relationship according to the GPU connection level, the GPU connection relationship, and the node connection relationship of each of the computing nodes,
wherein the GPU connection level is used to represent a transmission performance between GPUs.

2. The method of claim 1, further comprising:
in a case where the task type of the target task comprised in the task information is multi-task and the number of GPUs applied for is larger than 1,
when a traversal result indicates that there are candidate computing nodes with GPU resources that are able to satisfy the target task, selecting a computing node with a highest transmission performance from the candidate computing nodes as the target computing node.

3. The method of claim 1, further comprising:
in a case where the task type of the target task comprised in the task information is multi-task and the number of GPUs applied for is larger than 1,
when a traversal result indicates that there are no candidate computing nodes with GPU resources that are able to satisfy the target task, for each task in the target task, selecting a computing node, in which a number of GPUs is able to satisfy the task, from the computing nodes as the target computing node, according to a descending order of transmission performances of the computing nodes.

4. The method of claim 1, wherein the determining the target GPU in the target computing node according to the task request and the GPU topology relationship, further comprises:
acquiring a GPU connection level and a GPU connection relationship of the target computing node according to the GPU topology relationship; and
selecting the target GPU from GPUs comprised in the target computing node according to the GPU connection level of the target task, and the GPU connection level and the GPU connection relationship of the target computing node.

5. An electronic device, comprising:
at least one processor; and
a memory connected communicatively to the at least one processor, wherein
the memory stores instructions executable by the at least one processor, and the instructions, when executed by the at least one processor, enable the at least one processor to perform operations of:
acquiring a graphics processing unit (GPU) topology relationship of a cluster according to GPU connection information of each of computing nodes in the cluster;
in a case where a task request, for applying for a GPU resource, for a target task is received, determining a target computing node of the target task and a target GPU in the target computing node according to task information of the task request and the GPU topology relationship, to complete GPU resource scheduling of the target task, wherein the task information comprises a task type of the target task and/or a number of GPUs applied for; and
executing the target task by using the target GPU,
in a case where the task type of the target task comprised in the task information is single-task and the number of GPUs applied for is 1, traversing each of the computing nodes according to the GPU topology relationship, and selecting a computing node with a lowest transmission performance as the target computing node;
in a case where the task type of the target task comprised in the task information is single-task and the number of GPUs applied for is larger than 1, traversing each of the computing nodes according to the GPU topology relationship, and selecting a computing node with a highest transmission performance as the target computing node;

in a case where the task type of the target task comprised in the task information is multi-task and the number of GPUs applied for is larger than 1, traversing each of the computing nodes according to the GPU topology relationship, and determining whether there are candidate computing nodes with GPU resources that are able to satisfy the target task in the cluster, and determining the target computing node according to whether the candidate computing nodes exist;
wherein after determining the target computing node of the target task, a GPU connection level selected for the target task is written into an annotation of the target task, and determining the target GPU in the target computing node according to the task information of the task request and the GPU topology relationship comprises:
reading the GPU connection level selected for the target task; and
selecting a corresponding GPU as the target GPU according to the GPU connection level and the GPU topology relationship,
wherein the GPU connection information comprises a GPU connection relationship and a GPU connection manner, and the acquiring the GPU topology relationship of the cluster according to the GPU connection information of each of the computing nodes in the cluster, comprises:
acquiring the GPU connection manner, the GPU connection relationship, and a node connection relationship of each of the computing nodes in the cluster;
determining a GPU connection level of each of the computing nodes according to the GPU connection manner of each of the computing nodes; and
obtaining the GPU topology relationship according to the GPU connection level, the GPU connection relationship, and the node connection relationship of each of the computing nodes,
wherein the GPU connection level is used to represent a transmission performance between GPUs.

6. The electronic device of claim 5, wherein the operations further comprise:
in a case where the task type of the target task comprised in the task information is multi-task and the number of GPUs applied for is larger than 1,
when a traversal result indicates that there are candidate computing nodes with GPU resources that are able to satisfy the target task, selecting a computing node with a highest transmission performance from the candidate computing nodes as the target computing node.

7. The electronic device of claim 5, wherein the operations further comprise:
in a case where the task type of the target task comprised in the task information is multi-task and the number of GPUs applied for is larger than 1,
when a traversal result indicates that there are no candidate computing nodes with GPU resources that are able to satisfy the target task, for each task in the target task, selecting a computing node, in which a number of GPUs is able to satisfy the task, from the computing nodes as the target computing node, according to a descending order of transmission performances of the computing nodes.

8. The electronic device of claim 5, wherein the determining the target GPU in the target computing node according to the task request and the GPU topology relationship, further comprises:

acquiring a GPU connection level and a GPU connection relationship of the target computing node according to the GPU topology relationship; and selecting the target GPU from GPUs comprised in the target computing node according to the GPU connection level of the target task, and the GPU connection level and the GPU connection relationship of the target computing node.

9. A non-transitory computer-readable storage medium storing computer instructions, wherein the computer instructions, when executed by a computer, cause the computer to perform operations of:

acquiring a graphics processing unit (GPU) topology relationship of a cluster according to GPU connection information of each of computing nodes in the cluster;

in a case where a task request, for applying for a GPU resource, for a target task is received, determining a target computing node of the target task and a target GPU in the target computing node according to task information of the task request and the GPU topology relationship, to complete GPU resource scheduling of the target task, wherein the task information comprises a task type of the target task and/or a number of GPUs applied for; and executing the target task by using the target GPU, in a case where the task type of the target task comprised in the task information is single-task and the number of GPUs applied for is 1, traversing each of the computing nodes according to the GPU topology relationship, and selecting a computing node with a lowest transmission performance as the target computing node;

in a case where the task type of the target task comprised in the task information is single-task and the number of GPUs applied for is larger than 1, traversing each of the computing nodes according to the GPU topology relationship, and selecting a computing node with a highest transmission performance as the target computing node;

in a case where the task type of the target task comprised in the task information is multi-task and the number of GPUs applied for is larger than 1, traversing each of the computing nodes according to the GPU topology relationship, and determining whether there are candidate computing nodes with GPU resources that are able to satisfy the target task in the cluster, and determining the target computing node according to whether the candidate computing nodes exist;

wherein after determining the target computing node of the target task, a GPU connection level selected for the target task is written into an annotation of the target task, and determining the target GPU in the target computing node according to the task information of the task request and the GPU topology relationship comprises:

reading the GPU connection level selected for the target task; and selecting a corresponding GPU as the target GPU according to the GPU connection level and the GPU topology relationship, wherein the GPU connection information comprises a GPU connection relationship and a GPU connection manner, and the acquiring the GPU topology relationship of the cluster according to the GPU connection information of each of the computing nodes in the cluster, comprises:

acquiring the GPU connection manner, the GPU connection relationship, and a node connection relationship of each of the computing nodes in the cluster;

determining a GPU connection level of each of the computing nodes according to the GPU connection manner of each of the computing nodes; and obtaining the GPU topology relationship according to the GPU connection level, the GPU connection relationship, and the node connection relationship of each of the computing nodes, wherein the GPU connection level is used to represent a transmission performance between GPUs.

* * * * *